US006376404B1

(12) United States Patent
Giebelhausen et al.

(10) Patent No.: US 6,376,404 B1
(45) Date of Patent: *Apr. 23, 2002

(54) PROCESS FOR THE PRODUCTION OF SHAPED HIGH-PERFORMANCE ADSORBENTS

(75) Inventors: Jann-Micheal Giebelhausen, Rathenow; Hubertus Spieker, Paderborn, both of (DE)

(73) Assignee: CarboTex, GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,159

(22) Filed: Mar. 15, 2000

(30) Foreign Application Priority Data

Mar. 17, 1999 (DE) .......................................... 199 12 153

(51) Int. Cl.⁷ .............................................. C01B 31/10
(52) U.S. Cl. ......................................... 502/10; 502/432
(58) Field of Search ........................ 502/10, 418, 432, 502/437; 201/25, 38

(56) References Cited

U.S. PATENT DOCUMENTS

| | | |
|---|---|---|
| 4,040,990 A | 8/1977 | Neely |
| 4,118,341 A | 10/1978 | Ishibashi et al. |
| 4,237,107 A | 12/1980 | Gillot et al. |
| 4,615,993 A | 10/1986 | Schirmacher et al. |
| 4,957,897 A | 9/1990 | Maroldo et al. |
| 5,212,144 A | 5/1993 | Schwartz, Jr. |
| 5,416,056 A | 5/1995 | Baker |
| 5,510,063 A | 4/1996 | Gadkaree et al. |

FOREIGN PATENT DOCUMENTS

| | | |
|---|---|---|
| DE | 2 024 210 | 12/1971 |
| DE | 35 10 209 A1 | 9/1986 |
| DE | 43 04 026 A1 | 9/1993 |
| DE | 44 16 576 C1 | 11/1995 |
| DE | 196 00 237 A1 | 7/1996 |
| DE | 195 38 373 A1 | 4/1997 |
| DE | 196 25 069 A1 | 1/1998 |
| FR | 79 09871 | 11/1979 |
| GB | 1001161 | 8/1965 |
| GB | 2 280 898 | 2/1995 |
| WO | 27022 | 2/1964 |
| WO | 63768 | 9/1968 |

*Primary Examiner*—Stuart L. Hendrickson
(74) *Attorney, Agent, or Firm*—Keusey, Tutunjian & Bitetto

(57) ABSTRACT

The invention relates to the production of shaped high-performance adsorbents by steam activation in a rotary tunnel kiln operating in batches, in which spherically pre-formed materials are carefully pre-dried in a rotary tunnel dryer with 4-fold product turnover per kiln rotation and with a space/time ratio of from 1 to 2.5 $m^3/h$ using hot gas, then carbonised in an indirectly heated rotary tunnel kiln with 6-fold product turnover per kiln rotation and with a space/time ratio of from 5 to 10 $m^3/h$ in an inert-gas flow, and the carbonised semi-finished articles are activated in batches in an indirectly heated rotary tunnel kiln with 8-fold product turnover per kiln rotation and with a space/time ratio of from 1 to 5 $m^3/h$ with the addition of steam in an inert-gas flow.

High-quality shaped high-performance adsorbents are obtained which are versatile and especially suitable for use in air separation, adsorptive cooling and as adsorbent components in textiles and synthetic fabrics.

5 Claims, No Drawings

PROCESS FOR THE PRODUCTION OF SHAPED HIGH-PERFORMANCE ADSORBENTS

The invention relates to a process for the production of evenly shaped high-performance adsorbents by steam activation in a rotary tunnel kiln operating in batch mode. The high-performance adsorbents produced are extremely versatile. They may, in particular, be employed for air separation, adsorptive cooling and as adsorbent components in textiles and synthetic fabrics.

It is known to use already pre-formed starting materials for the production of adsorbents. It is also known to produce shaped starting products from carbon-based materials and a binder using various processes, and subsequently to process them by carbonising and activation to form adsorbents.

WP 27 022 describes the production of adsorbent carbon by charring ion exchange resins.

WP 63 768 discloses a process for the production of shaped activated carbon for oil sorption from water, sulphonated styrene-divinylbenzene cation exchange resins being heat-treated at temperatures of from 250° C. to 1000° C. so as to form a carbon Process for the production of shaped high-performance adsorbents product having a carbon content of 80–90% which is subsequently activated using steam.

Both processes start from pre-formed starting materials. The adsorbents produced have too low an adsorption capacity. The pore structure needed for high-performance adsorbents cannot be formed owing to the nature of the process.

U.S. Pat. No. 4,040,990 describes partially pyrolized particles with a macroporous pore distribution of from 50 to 100,000 angstroms and high abrasion strength for use in adsorption, molecular separation and catalysis. The starting products are preformed, macroporous synthetic polymers which are partially pyrolized in an inert-gas flow. Because of the insufficiently formed pore structure distribution and the excessively low total pore volume, these partially pyrolized particles do not meet the quality criteria required of high-performance adsorbents. A controlled distribution, defined as a function of the intended purpose, of the micro-, meso- and macropores cannot be produced by using pyrolysis.

U.S. Pat. No. 4,957,897 discloses a process for the production of carbonised adsorbents from pre-formed, sulphonated, macroporous, aromatic polymers. By pyrolysis at from more than 300° C. to more than 1200° C., a multimodal pore size distribution with a micropore volume of at least 0.02 $cm^3/g$ is obtained in an inert-gas atmosphere. The pyrolysis process may also take place in the presence of an activating atmosphere consisting of steam or ammonia at temperatures of 800° C.–1000° C. Furthermore, a pretreatment of the carbonised adsorbents by means of sulphonating, chloromethylating, amines or hydrogen bromide is proposed. This process also is unsuitable for producing high-performance adsorbents with a BET surface area of at least 1400 $m^2/g$ and a defined pore structure. The pre-treatment with special organic and inorganic products increases the equipment expenditure, but not the quantitative and quantitative yields.

The subject of DE 19 60 02 37 and DE 19 62 50 69 is the production of granular activated carbon from a spherical styrene/divinylbenzene copolymer matrix. The styrene-divinyl copolymer matrix is carbonised at 750° C. or higher with from 5 to 50 per cent by weight sulphuric acid, 39–92 per cent by weight concentrated sulphuric acid and/or oleum, and then activated at a temperature of from 800 to 900° C. with the addition of steam, atmospheric oxygen or carbon dioxide in a rotary tunnel kiln or in a fluidised bed.

The use of sulphuric acid and/or oleum during the carbonising leads to an increased environmental burden, associated with greater equipment expenditure. Together with the additional costs for sulphuric acid and/or oleum, the low total yield of 15% compromises the economic results. The quality targets stipulated for high-performance adsorbents are not met.

A process for the production of spherical activated carbon from carbon-based renewable raw materials, which are impregnated with lithium salts and mixed with rich coal, cellulose and a self-curing synthetic resin binder, then dried, cured, carbonised and activated, is disclosed by DE 44 16 576 and DE 19 53 83 73.

It is also known to produce microspheres from ground activated carbon which is dispersed in a water-insoluble synthetic resin and then compressed, powdered, granulated and dried, according to DE 35 10 209.

These processes involve the production of the spherical starting material. The spherical activated carbons produced do not have sufficient abrasion strength, hardness and adsorption performance. The particle size is not exactly defined and the geometrical sphere formation is not uniform. The equipment expenditure with this technology is high owing to the nature of the processes.

The object of the invention is to produce shaped high-performance adsorbents for use in air separation, adsorptive cooling and as adsorbent components in textiles and synthetic fabrics from carbon-based materials of various origin, without great equipment expenditure and using an economical process. The high-performance adsorbents are intended to have a high adsorption capacity, very good stability with respect to mechanical and hydraulic loading and, for rheological reasons, a uniform spherical shape. With a view to economically viable industrial application, they must be repeatedly regenerable.

The high-performance adsorbents are prepared from spherically pre-formed materials which contain at least 12% fixed carbon expressed in terms of solids content, such as polymer resins, acetylene coke and pearl cellulose by steam activation in an indirectly heated rotary tunnel kiln on a batch scale.

According to the invention, the spherically pre-formed materials are carefully pre-dried in a rotary tunnel dryer with 4-fold product turnover per kiln rotation and with a space/time ratio of from 1 to 2.5 $m^3/h$ using hot gas to a residual moisture content of at least 25%, then carbonised in an indirectly heated rotary tunnel kiln operating in batches with 6-fold product turnover per kiln rotation, with a space/time ratio of from 5 to 10 $m^3/h$ and with a reduced pressure on the flue-gas side of 1.5–3.0 mm water column in an inert-gas flow to a fixed carbon content of from 80 to 97%, and activated in batches in an indirectly heated rotary tunnel kiln with 8-fold product turnover per kiln rotation, with a space/time ratio of from 1 to 5 $m^3/h$ with a reduced pressure on the flue-gas side of 0.05–1.0 mm water column in an inert-gas flow with the addition of from 0.2 to 0.3 kg/h.kg of steam, with a constant product temperature profile over the entire heated kiln range of from 910° C. to 920° C.

During the drying in the kiln, the product temperature is increased in stages by from 8 to 10° C./min to a final temperature of from 200 to 300° C., and the final temperature is kept constant for from 30 to 60 minutes.

The carbonising is carried out in temperature intervals with a heating rate of from 6 to 9° C./min in the temperature range from 30 to 300° C., from 2 to 4° C./min in the temperature range from 300 to 500° C. and from 1 to 30° C./min in the temperature range from 500 to 800° C. final temperature.

During the activation, the required quantity of steam is delivered to the activation kiln in a controlled way through nozzles, with, calculated in terms of the heated kiln length from the product input, 15% of the quantity of steam being added in the 16 to 18% range, 20% of the quantity of steam in the 42 to 44% range, 30% of the quantity of steam in the 53 to 55.20% range, 20% of the quantity of steam in the 66 to 68% range, and 15% in the 82 to 84% kiln range.

The invention makes it possible to produce shaped high-performance adsorbents with very high adsorption capacity, characterised by iodine adsorption, of at least 1400 mg/g and very good resistance to mechanical and hydraulic loading from spherically pre-formed raw materials of various origin. Shaped high-performance adsorbents produced using the process according to the invention have a broad pore spectrum with uniform distribution of micro-, meso- and macropores, and are hence especially suitable for use in air separation, adsorptive cooling and as adsorbent components in textiles and synthetic fabrics.

A particular advantage is that an optimum quality/yield ratio is obtained through careful drying, carbonising and activation.

According to the invention, the shaped high-performance adsorbents can be produced with minor equipment expenditure and hence economically. The high-performance adsorbents are repeatedly regenerable because of their high hardness and abrasion strength.

The invention will be explained in more detail with the aid of the following embodiment examples.

EXAMPLE 1

A polymer resin with the following quality specification was used as a starting product for the production according to the invention of shaped high-performance adsorbents:

| | | |
|---|---|---|
| Water content: | 48.5% | |
| Volatile components: | 59.0% | |
| Ash content: | 3.6% | |
| Fixed carbon: | 37.4% | |
| Sulphur content: | 15.2% | |
| Particle size: | | |
| >1.25 mm | 0.1% | |
| 125–1.00 mm | 4.2% | |
| 1.00–0.80 mm | 40.0% | |
| 0.80–0.50 mm | 53.6% | |
| <0.50 mm | 2.1% | |

The spherically pre-formed raw material was carefully pre-dried in batches in a rotary tunnel dryer having lifting scoops which ensured 4-fold product turnover per kiln rotation, with a space/time ratio of 1.9 m$^3$/h using hot gas to a residual moisture content of 21.5%. During the drying process, the product temperature was increased in stages by 8° C./min to the final temperature of 300° C., and the final temperature was kept constant for 45 minutes.

The pre-dried product was then carbonised in an indirectly heated rotary tunnel kiln with 6-fold product turnover per kiln rotation and with a space/time ratio of 7 m$^3$/h in an inert gas flow to a fixed carbon content of 88.3%. The carbonising was carried out in batches in temperature intervals with a heating rate of 9° C./min in the temperature range from 30 to 300° C., 4° C./min in the temperature range from 300 to 500° C. and 3° C./min in the temperature range from 500 to 800° C. final temperature, while maintaining a reduced pressure on the flue-gas side of 1.5 mm water column.

For the subsequent activation, an indirectly heated rotary tunnel kiln with 8-fold product turnover per kiln rotation and a space/time ratio of 2.12 m$^3$/h was likewise used. The activation was carried out in batches with the addition of 0.25 kg/h.kg of steam, with a constant product temperature profile over the entire heatable kiln length of 920° C. in an inert-gas flow with a reduced pressure on the flue-gas side of 0.1 mm water column.

The required quantity of steam was delivered to the activation kiln in a controlled way through nozzles as follows:

15% of the quantity of steam in the 17% kiln length range,
20% of the quantity of steam in the 43% kiln length range,
30% of the quantity of steam in the 54% kiln length range,
20% of the quantity of steam in the 67% kiln length range,
15% of the quantity of steam in the 83% kiln length range, calculated in each case in terms of the heated kiln length from the product input.

The high-performance adsorbents were cooled and the nominal particle fraction from 0.8 to 0.315 mm was screened.

The shaped high-performance adsorbents produced according to the invention from polymer resin have the following quality pararmeters:

| | | | | |
|---|---|---|---|---|
| Packing Density | 545 | g/l | | |
| Ash | 0.8% | | | |
| Iodine number | 1565 | mg/g | | |
| Methylene blue titre | 38.3 | ml | | |
| BET surface area | 1610 | m$^2$/g | | |
| Abrasion resistance | 100% | | | |
| Impact Strength | 95% | | | |
| Ball-pan hardness | 100% | | | |
| Hydraulic resistance | 100% | | | |
| Regeneration loss | 1% | | | |
| Particle size: | >0.80 | mm | 0.2% | |
| | 0.80–0.50 | mm | 8.6% | |
| | 0.50–0.40 | mm | 76.4% | |
| | 0.40–0.315 | mm | 14.7% | |
| | <0.315 | mm | 0.1% | |
| Qualitative yield | 28% | | | |

The shaped high-performance absorbents are distinguished by a very high adsorption capacity and surprising resistance to mechanical and hydraulic loading. They are repeatedly regenerable and have a broad pore spectrum with uniform distribution of micro-, meso- and macropores. The shaped high-performance adsorbents produced according to the invention are especially suitable for use in air separation, adsorptive cooling and as adsorbent components in textiles and synthetic fabrics.

EXAMPLE 2

A spherically pre-formed acetylene coke with the following quality specification was used as a starting product for the production according to the invention of shaped high-performance adsorbents:

| | |
|---|---|
| Water content: | 15.4% |
| Volatile components: | 11.8% (dry) |
| Fixed carbon: | 88.05% (dry) |
| Ash: | 0.15% (dry) |

| Particle size: | |
|---|---|
| >1.00 mm | 20.6% |
| 1.00–0.80 mm | 11.8% |
| 0.80–0.50 mm | 16.9% |
| 0.50–0.40 mm | 27.1% |
| 0.40–0.20 mm | 23.4% |
| <0.20 mm | 0.2% |

The acetylene coke was pre-dried in batches in a rotary tunnel dryer with a space/time ratio of 2.5 m$^3$/h using hot gas to a residual moisture content of 4.0% with 4-fold product turnover per kiln rotation by means of built-in lifting scoops. The drying process took place with a staged increase of the product temperature by 9° C./min to a final temperature of 200° C., and subsequent constant operation for 45 minutes. The pre-dried product was transferred to an indirectly heated rotary tunnel kiln having lifting scoops which allowed 6-fold product turnover per kiln rotation. The carbonising was carried out in batches with a space/time ratio of 7 m$^3$/h in an inert-gas flow to a fixed carbon content of 95.8%, with a heating rate of 9° C./min being set in the temperature range from 30 to 300° C., 4° C./min in the temperature range from 300 to 500° C. and 3° C./min in the temperature range from 500 to 800° C. A reduced pressure of 2.5 mm water column was applied on the flue-gas side of the rotary tunnel kiln.

The subsequent activation in batches was carried out in an indirectly heated rotary tunnel kiln with 8-fold product turnover per kiln rotation, a space/time ratio of 2 m$^3$/h and with the addition of 0.3 kg/h.kg of steam in an inert-gas flow. In this case, the product temperature profile over the entire heated kiln length was kept constant at 910° C. and a reduced pressure on the flue-gas side of 1.0 mm water column was set up.

The 0.3 kg/h.kg quantity of water was delivered to the activation kiln in a controlled way through nozzles as follows:

15% of the quantity of water in the 16% kiln length range,
20% of the quantity of water in the 42% kiln length range,
30% of the quantity of water in the 53% kiln length range,
20% of the quantity of water in the 66% kiln length range,
15% of the quantity of water in the 82% kiln length range,
in each case calculated in terms of the heated kiln length from the product input.

After removal, the final product was cooled and screened at 0.8 and 0.315 mm.

The shaped high-performance adsorbents produced according to the invention from acetylene coke are characterised by the following quality values:

| Packing Density | 465 g/l |
|---|---|
| Ash | 1.4% |
| Iodine number | 1435 mg/g |
| Methylene blue titre | 33.1 ml |
| BET surface area | 1480 m$^2$/g |
| Abrasion resistance | 100% |
| Impact Strength | 97% |
| Ball-pan hardness | 100% |
| Hydraulic resistance | 100% |
| Regeneration loss | 2% |

| Particle size: | >0.80 mm | 1.8% |
|---|---|---|
| | 0.80–0.50 mm | 15.6% |
| | 0.50–0.40 mm | 64.7% |
| | 0.40–0.315 mm | 17.8% |
| | <0.315 mm | 0.1% |
| Qualitative yield | 31.5% | |

The shaped high-performance adsorbents have very good adsorption and desorption capabilities. The stability of the high-performance adsorbents with respect to any loading and the capacity for regeneration underline the especial suitability for air separation and adsorptive cooling.

EXAMPLE 3

Pearl cellulose, which is already spherically pre-formed, with the following specification was used for the production according to the invention of shaped high-performance adsorbents:

| Water content: | 68.5% |
|---|---|
| Volatile components: | 82.8% (dry) |
| Fixed carbon: | 14.0% (dry) |
| Ash: | 3.2% (dry) |
| Particle size: | |
| >1.00 mm | 1.9% |
| 1.00–0.80 mm | 9.2% |
| 0.80–0.50 mm | 88.6% |
| <0.50 mm | 0.3% |

The pearl cellulose was carefully pre-dried in batches in a rotary tunnel dryer using hot gas with a space/time ratio of 1.7 m$^3$/h and 4-fold product turnover per kiln rotation, to a residual moisture content of 22.3%. During the drying process, the product temperature was increased in steps by 10° C./min to a final temperature of 300° C., and the process was continued at a constant temperature of 300° C. for 60 minutes.

The carbonising of the pre-dried product was carried out in an indirectly heated rotary tunnel kiln with a space/time ratio of 6.2 m$^3$/h and with 6-fold product turnover per kiln rotation with an inert-gas flow on a batch scale. The heating rate during the carbonising was controlled in such a way that the product temperature was increased in the temperature range from 30 to 300° C. by 7° C./min, in the temperature range from 300 to 500° C. by 3° C./min and in the temperature range from 500 to 800° C. by 2° C./min, while a reduced pressure of 2.0 mm water column was applied on the flue-gas side. A carbon content of 85.2% was thereby obtained in the carbonised product. The carbonised product was then activated in batches in an indirectly heated rotary tunnel kiln with 8-fold product turnover per kiln rotation and with a space/time ratio of 3.0 m$^3$/h with the addition of 0.2 kg/h.kg of steam in an inert-gas flow. The reduced pressure on the flue-gas side was 0.5 mm water column and the product temperature profile kept constant over the entire heated kiln length was 915° C.

The steam for the activation process was delivered as follows:

15% of the quantity of steam in the 18% kiln length range,
20% of the quantity of steam in the 44% kiln length range,
30% of the quantity of steam in the 54% kiln length range,
20% of the quantity of steam in the 68% kiln length range, 15% of the quantity of steam in the 84% kiln length range, calculated in terms of the heated kiln length from the product input.

Following the activation, the high-performance adsorbents were cooled and the nominal particle fraction from 0.8 to 0.315 mm was screened.

The shaped high-performance adsorbents produced according to the invention from pearl cellulose are distinguished by the following quality parameters:

| | | | |
|---|---|---|---|
| Packing Density | 425 | g/l | |
| Ash | 3.6% | | |
| Iodine number | 1530 | mg/g | |
| Methylene blue titre | 37.2 | ml | |
| BET surface area | 1586 | m²/g | |
| Abrasion resistance | 96% | | |
| Impact Strength | 90% | | |
| Ball-pan hardness | 100% | | |
| Hydraulic resistance | 100% | | |
| Regeneration loss | 4% | | |
| Particle size: | >0.80 | mm | 0.1% |
| | 0.80–0.50 | mm | 9.7% |
| | 0.50–0.40 | mm | 70.6% |
| | 0.40–0.315 | mm | 19.4% |
| | <0.315 | mm | 0.2% |
| Qualitative yield | 25.1% | | |

The shaped high-performance adsorbents have outstanding adsorption and desorption properties and very good mechanical and hydraulic stability. The high-performance adsorbents are especially suitable as adsorbent components in textiles and synthetic fabrics.

What is claimed is:

1. Process for the production of shaped high-performance adsorbents, from spherically pre-formed materials whose fixed carbon solids content with regard to dry substance is at least 12%, by means of steam activation under an inert gas in an indirectly heated rotary tunnel kiln, characterised in that the spherically pre-formed materials are pre-dried in a rotary tunnel dryer with 4-fold product turnover per kiln rotation and with a space/time ratio of from 1 to 2.5 m³/h using hot gas to a residual moisture content of 25%, the pre-dried semi-finished articles are carbonised in batches with 6-fold product turnover per kiln rotation and with a space/time ratio of from 5 to 10 m³/h and with a reduced pressure on the flue-gas side of 1.5–3.0 mm water column in an inert-gas flow in an indirectly heated rotary tunnel kiln to a fixed carbon content of from 80 to 97%, and the carbonised semi-finished articles are then activated in batches with 8-fold product turnover per kiln rotation and with a space/time ratio of from 1 to 5 m³/h with a reduced pressure on the flue-gas side of 0.05–1.0 mm water column with the addition of from 0.2 to 0.3 kg/h.kg of steam in an inert-gas flow in an indirectly heated rotary tunnel kiln.

2. Process according to claim 1, characterised in that, during the drying process, the product temperature is increased in stages by from 8 to 10° C./min to a final temperature of from 200 to 300° C., and the final temperature is kept constant for from 30 to 60 minutes.

3. Process according to claim 1, characterised in that the carbonising is carried out in temperature intervals with a heating rate of from 6 to 9° C./min in the temperature range from 30 to 300° C., from 2 to 4° C./min in the temperature range from 300 to 500° C. and from 1 to 3° C./min in the temperature range from 500 to 800° C. final temperature.

4. Process according to claim 1, characterized in that the quantity of steam is delivered to the activation kiln in a controlled way through nozzles, with 15% of the quantity of steam being added in the 16 to 18% kiln length range, 20% of the quantity of steam in the 42 to 44% kiln length range, 30% of the quantity of steam in the 53 to 55% kiln length range, 20 of the quantity of steam in the 66 to 68% kiln length range and 15% in the 82 to 84% kiln length range, in each case calculated in terms of the heated kiln length from the product input.

5. Process according to claim 1, characterised in that the material is activated with a product temperature profile over the entire heated kiln length of from 910° C. to 920° C.

\* \* \* \* \*